(12) United States Patent
Hasegawa (10) Patent No.: US 8,342,401 B2
(45) Date of Patent: Jan. 1, 2013

(54) CODE READING APPARATUS AND CONTROL METHOD

(75) Inventor: Keiichi Hasegawa, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/220,908

(22) Filed: Aug. 30, 2011

(65) Prior Publication Data

US 2012/0048933 A1  Mar. 1, 2012

(30) Foreign Application Priority Data

Sep. 1, 2010  (JP) ................................. 2010-196183

(51) Int. Cl.
*G06K 5/00* (2006.01)
(52) U.S. Cl. .................... 235/437; 235/462.14; 235/383
(58) Field of Classification Search ............. 235/462.14, 235/383, 437
See application file for complete search history.

(56) References Cited

U.S. PATENT DOCUMENTS

| 2004/0065740 | A1* | 4/2004 | Mergenthaler et al. | .. 235/462.14 |
| 2010/0059589 | A1* | 3/2010 | Goncalves et al. | ........... 235/383 |

FOREIGN PATENT DOCUMENTS

| JP | 05-233867 | 9/1993 |
| JP | 06-028512 | 2/1994 |
| JP | 06-223271 | 8/1994 |
| JP | 08-147403 | 6/1996 |
| JP | 2009-301320 | 12/2009 |

OTHER PUBLICATIONS

Japanese Office Action for Japanese Application No. 2010-196183 mailed on Sep. 25, 2012.

* cited by examiner

*Primary Examiner* — Daniel Hess
(74) *Attorney, Agent, or Firm* — Turocy & Watson, LLP (57) ABSTRACT

According to one embodiment, a code reading apparatus includes an image capturing section configured to capture an image picked up by an image pickup section; a code reading section configured to detect a code symbol included in the captured image and read code information corresponding to the code symbol; an image comparing section configured to compare, if the code information read this time and code information read before this time and most recently are the same, images related to the reading of the pieces of code information; and an output section configured to output the read code information and, if the images are similar as a result of the comparison of the images, regard the code information read this time as code information read twice and suppress output of the code information.

12 Claims, 5 Drawing Sheets

CODE READING APPARATUS AND CONTROL METHOD

CROSS-REFERENCE TO RELATED APPLICATIONS

This application is based upon and claims the benefit of priority from the prior Japanese Patent Application No. 2010-196183, filed on Sep. 1, 2010; the entire contents of which are incorporated herein by reference.

FILED

Embodiments described herein relate generally to a code reading apparatus and a control method.

BACKGROUND

In a supermarket and the like, commodities affixed with code symbols such as barcodes and two-dimensional codes (e.g., QR codes (registered trademark)) are sold. The code symbols of the commodities are obtained by non-intrinsically and latently symbolizing, on the basis of a fixed rule, codes for specifying the commodities. The code symbols are optically read and decoded by a code reading apparatus such as a barcode scanner.

Some code reading apparatus picks up an image of a commodity or the like with a digital camera such as a CCD (Charge Coupled Device) image sensor, detects a code symbol from the picked-up image, and decodes the code symbol. A store clerk takes out a commodity stored in a shopping basket carried onto a counter table by a customer and holds the commodity over the digital camera of the code reading apparatus to input and register a code of the commodity to be purchased by the customer.

In the code reading apparatus in the past explained above, at an interval after reading of a code from a picked-up image, the next code is read. In this way, a code by the same code symbol is prevented from being read twice. However, in the code reading apparatus in the past, a code is read twice if a code symbol stays long in a reading area of the digital camera when the store clerk holds a commodity over the digital camera or if a commodity that frames out of the reading area of the digital camera enters the reading area again. Therefore, the code reading apparatus is insufficient to prevent a code from being read twice.

DETAILED DESCRIPTION

In general, according to one embodiment, a code reading apparatus includes an image capturing section, a code reading section, an image comparing section, and an output section. The image capturing section captures an image picked up by an image pickup section. The code reading section reads code information corresponding to a code symbol included in the captured image. If the code information read this time and code, information read before this time and most recently are the same, the image comparing section compares images related to the reading of the pieces of code information. The output section outputs the read code information and, if the images are similar as a result of the comparison of the images, regards the code information read this time as code information read twice and suppresses output of the code information.

In general, according to another embodiment, a control method is a control method for a code reading apparatus including an image capturing step, a code reading step, an image comparing step, and an output step. In the image capturing step, an image picked up by an image pickup section is captured. In the code reading step, code information corresponding to a code symbol included in the captured image is read. In the image comparing step, if the code information read this time and code information read before this time and most recently are the same, images related to the reading of the pieces of code information are compared. In the output step, the read code information is output and, if the images are similar as a result of the comparison of the images, the code information read this time is regarded as code information read twice and output of the code information is suppressed.

A code reading apparatus and a control method according to an embodiment are explained with reference to the accompanying drawings using a checkout system as an example. The checkout system includes a POS (Point Of Sale) terminal that performs registration and settlement of commodities purchased in one transaction and a commodity code reading apparatus that reads commodity codes and the like affixed to the commodities. This embodiment is an application example to a checkout system installed in a store such as a restaurant or a supermarket.

Figure 1:
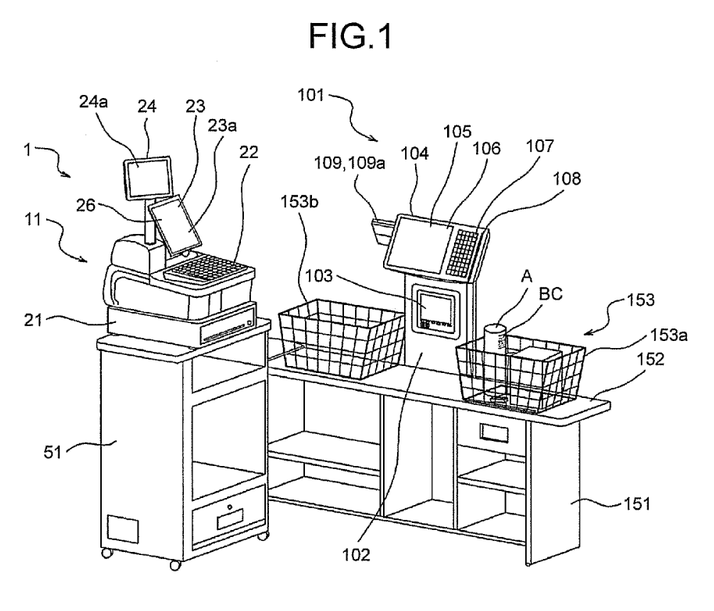
FIG. 1 is a perspective view of a checkout system.

FIG. 1 is a perspective view of a checkout system 1. As shown in FIG. 1, the checkout system 1 includes a POS terminal 11 that performs registration and settlement of commodities purchased on one transaction. The POS terminal 11 is placed on the upper surface of a drawer 21 on a checkout table 51. The drawer 21 is controlled to be opened by the POS terminal 11. A keyboard 22 operated to be pressed by an operator (a store clerk) is arranged on the upper surface of the POS terminal 11. A display device 23 configured to display information to the operator who operates the keyboard 22 is provided further on the depth side than the keyboard 22 viewed from the operator. The display device 23 displays information on a display surface 23a thereof. A touch panel 26 is laminated on the display surface 23a. A customer display device 24 is vertically provided to freely rotate further on the depth side than the display device 23. The customer display device 24 displays information on a display surface 24a thereof. In the customer display device 24 shown in FIG. 1, the display surface 24a is faced to the front side in FIG. 1. However, the customer display device 24 is rotated such that the display surface 24a faces the depth side in FIG. 1, whereby the customer display device 24 displays information to a customer.

A counter table 151 having a laterally long table shape is arranged to form an L shape with the checkout table 51 on which the POS terminal 11 is placed. A loading surface 152 is formed on the upper surface of the counter table 151. A shopping basket 153 that stores a commodity A affixed with a barcode BC is placed on the loading surface 152. The shopping basket 153 can be considered separately as a first shopping basket 153a carried in by the customer and a second shopping basket 153b located in a position across a commodity code reading apparatus 101 from the first shopping basket 153a.

The commodity code reading apparatus 101 connected to the POS terminal 11 to freely transmit and receive data to and from the POS terminal 11 is set on the loading surface 152 of the counter table 151. The commodity code reading apparatus 101 includes a housing 102 having a thin rectangular shape. A reading window 103 is arranged in the front of the housing 102. A display and operation section 104 is attached to an upper part of the housing 102. A display device 106, on the surface of which a touch panel 105 is laminated, is provided in the display and operation section 104. A keyboard 107 is disposed on the right of the display device 106. A card reading groove 108 of a not-shown card reader is provided on the right of the keyboard 107. A customer display device 109 provided to be faced to the customer and used for displaying information to the customer is set on the left depth side on the rear surface of the display and operation section 104 viewed from the operator. A customer touch panel 109a is laminated on a display surface of the customer display device 109.

The commodity A purchased in one transaction is stored in the first shopping basket 153a carried in by the customer. The barcode BC obtained by encoding a commodity code (code information) concerning the commodity A is affixed to the commodity A. The commodity A is moved to the second shopping basket 153b by a hand of the operator. In this moving process, the barcode BC is faced to the reading window 103 of the commodity code reading apparatus 101. When the barcode BC is faced to the reading window 103, an image pickup section 164 (see FIG. 2) arranged on the depth side of the reading window 103 picks up an image of the barcode BC. The commodity code reading apparatus 101 detects and decodes the barcode BC affixed to the commodity A included in the image picked up by the image pickup section 164 to read a commodity code corresponding to the commodity A. Subsequently, the commodity code reading apparatus 101 outputs the read commodity code to the POS terminal 11.

The commodity code described as the barcode BC is a code allocated to each commodity to specify the commodity A. As an example, the commodity code is a JAN (Japanese Article Number) code, which is a thirteen-digit number. In this embodiment, the barcode BC is explained as an example of a code symbol. However, it goes without saying that the code symbol may be a two-dimensional code such as a QR code (registered trademark).

Figure 2:
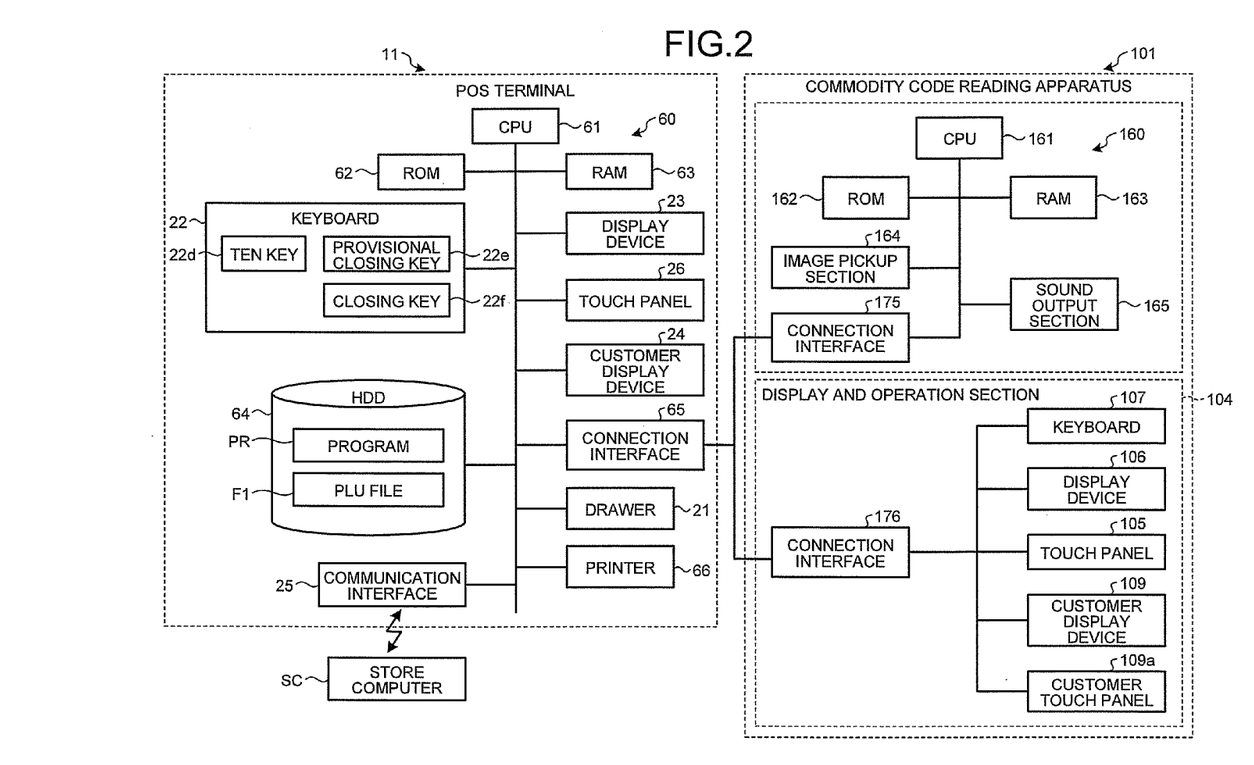
FIG. 2 is a block diagram of hardware configurations of a POS terminal and a commodity code reading apparatus.

FIG. 2 is a block diagram of hardware configurations of the POS terminal 11 and the commodity code reading apparatus 101. The POS terminal 11 includes a microcomputer 60 functioning as an information processing section configured to execute information processing. The microcomputer 60 is configured by connecting, via a bus, a ROM (Read Only Memory) 62 and a RAM (Random Access Memory) 63 to a CPU (Central Processing Unit) 61 configured to execute various kinds of arithmetic processing and control sections.

All of the drawer 21, the keyboard 22, the display device 23, the touch panel 26, and the customer display device 24 are connected to the CPU 61 of the POS terminal 11 via various input and output circuits (all of which are not shown in the figure). These devices are controlled by the CPU 61.

The keyboard 22 includes a ten key 22d, on the upper surface of which numbers "1", "2", "3", and the like and a multiplication operator "×" are displayed, a provisional closing key 22e, and a closing key 22f. The keyboard 22 outputs an operation input of the operator by the ten key 22d, the provisional closing key 22e, and the closing key 22f to the CPU 61. The keyboard 22 is operating means configured to receive operation from the operator.

A HDD (Hard Disk Drive) 64 is connected to the CPU 61 of the POS terminal 11. A computer program and various files are stored in the HDD 64. When the POS terminal 11 is started, all or a part of the computer program and the files stored in the HDD 64 are copied to the RAM 63 and sequentially executed by the CPU 61. An example of the computer program stored in the HDD 64 is a computer program PR for commodity sales data processing. An example of the files stored in the HDD 64 is a PLU file F1 distributed from a store computer SC and stored in the HDD 64.

The PLU file F1 is a file in which, for each commodity code uniquely allocated to each commodity, information concerning the commodity such as a name, a unit price, and a commodity classification of the commodity is stored. In other words, the PLU file F1 stores, as related information related to a commodity code, information such as a name, a unit price, and a commodity classification of a commodity corresponding to the commodity code. The POS terminal 11 can register, referring to the information stored in the PLU file F1 with a commodity code read by the commodity code reading apparatus 101, sales of a commodity corresponding to the read commodity code.

A communication interface 25 for executing data communication with the store computer SC is connected to the CPU 61 of the POS terminal 11 via an input and output circuit (not shown). The store computer SC is set in a backyard or the like of the store. The PLU file F1 to be distributed to the POS terminal 11 is stored in a HDD (not shown) of the store computer SC.

A connection interface 65 enabling data transmission and reception between the POS terminal 11 and the commodity code reading apparatus 101 is connected to the CPU 61 of the POS terminal 11. Therefore, the connection interface 65 is connected to the commodity code reading apparatus 101. A printer 66 configured to perform printing on a receipt or the like is connected to the CPU 61 of the POS terminal 11. The POS terminal 11 prints, for example, transaction contents (a settlement amount and granted points) of one transaction on the receipt under the control by the CPU 61.

The commodity code reading apparatus 101 includes a microcomputer 160. The microcomputer 160 is configured by connecting a ROM 162 and a RAM 163 to a CPU 161 via a bus. A computer program to be executed by the CPU 161 is stored in the ROM 162. The image pickup section 164 and a sound output section 165 are connected to the CPU 161 via various input and output circuits (all of which are not shown). The operation of the image pickup section 164 and the sound output section 165 is controlled by the CPU 161. The display and operation section 104 is connected to the POS terminal 11 via a connection interface 176. The operation of the display and operation section 104 is controlled by the CPU 61 of the POS terminal 11.

The image pickup section 164 is a CCD image sensor, a CMOS (Complementary Metal Oxide Semiconductor) image sensor, or the like and performs image pickup from the reading window 103 under the control by the CPU 161. For example, the image pickup section 164 performs image pickup of a 30 fps moving image. Frame images sequentially picked up by the image pickup section 164 at a predetermined frame rate are stored in the RAM 163. The sound output section 165 is a sound circuit, a speaker, and the like for generating warning sound or the like set in advance. The sound output section 165 performs alerting by sound such as the warning sound under the control by the CPU 161.

Further, a connection interface 175 connected to the connection interface 65 of the POS terminal 11 and enabling data transmission and reception between the commodity code reading apparatus 101 and the POS terminal 11 is connected to the CPU 161. A commodity code read from an image picked up by the image pickup section 164 of the commodity code reading apparatus 101 is output via the connection interface 175 and input to the POS terminal 11 via the connection interface 65 under the control by the CPU 161.

Figure 3:
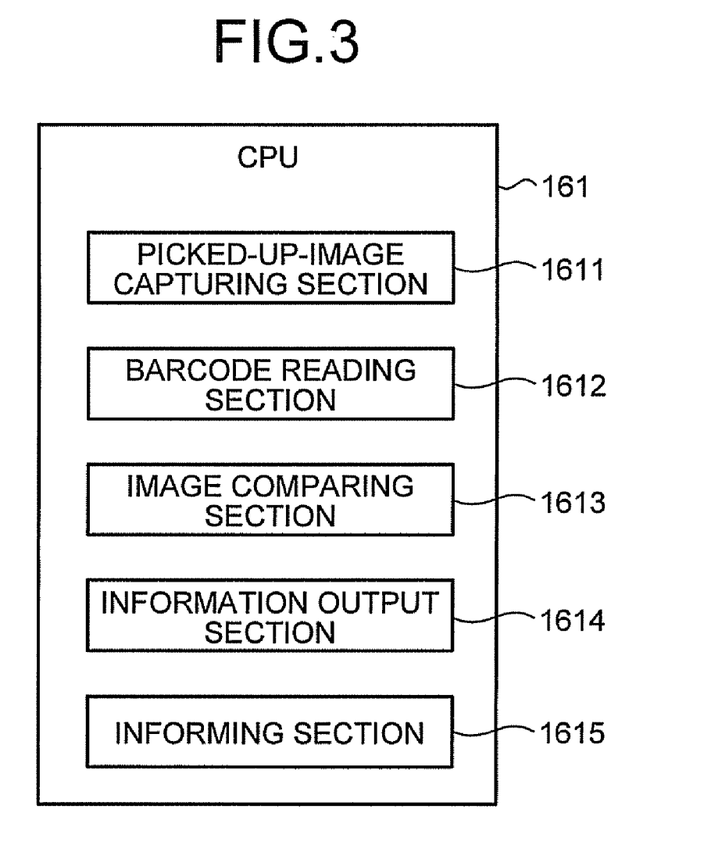
FIG. 3 is a block diagram of a functional configuration of a CPU.

Functional sections of the commodity code reading apparatus 101 realized by the CPU 161 sequentially executing a computer program are explained with reference to FIG. 3. FIG. 3 is a block diagram of a functional configuration of the CPU 161. As shown in FIG. 3, the CPU 161 sequentially executes the computer program to thereby include functions of a picked-up-image capturing section 1611, a barcode reading section 1612, an image comparing section 1613, an information output section 1614, and an informing section 1615.

The picked-up-image capturing section 1611 outputs an image pickup ON signal to the image pickup section 164 and causes the image pickup section 164 to start an image pickup operation. The picked-up-image capturing section 1611 sequentially captures frame images picked up by the image pickup section 164 and stored in the RAM 163 after the start of an image pickup operation.

The barcode reading section 1612 detects a code symbol affixed to a commodity included in a frame image captured by the picked-up-image capturing section 1611 and reads a commodity code (code information) corresponding to the code symbol. Specifically, the barcode reading section 1612 extracts a contour line from an image obtained by binarizing the captured frame image to detect a commodity included in the image. Subsequently, the barcode reading section 1612 performs, concerning the detected commodity, detection of the barcode BC by a pattern matching technique, detection of a two-dimensional code from a predetermined finder pattern, or the like. Subsequently, the barcode reading section 1612 converts the detected barcode BC or two-dimensional code into a commodity code (e.g., a JAN code) conforming to a predetermined rule to read a commodity code corresponding to the detected barcode BC or two-dimensional code. The read commodity code is temporarily stored in, for example, a work area of the RAM 163 by the barcode reading section 1612. Therefore, before being output to the POS terminal 11 by the information output section 1614 explained later, the read commodity code is temporarily stored in the RAM 163.

If the commodity code read by the barcode reading section 1612 this time and a commodity code read before the reading of the commodity code and most recently are the same, the image comparing section 1613 compares images related to the reading of the commodity codes. Specifically, the image comparing section 1613 reads out, from the RAM 163, a frame image from which the barcode reading section 1612 reads the commodity code this time and a frame image from which the barcode reading section 1612 reads the commodity code most recently. Subsequently, the image comparing section 1613 compares the read-out frame images and detects whether the frame images are similar to each other. Concerning the detection of similarity, the image comparing section 1613 extracts characteristic portions of images of a commodity, a hand of the store clerk, a code symbol, and the like using contour lines obtained by binarizing the frame images and, if the number of matching points of the extracted characteristic portions is equal to or larger than a predetermined number, detects that the frame images are similar. Concerning the hand of the store clerk, the image comparing section 1613 may detect the shape of the hand from the binarized contour lines. However, the image comparing section 1613 may detect a skin color area prior to the binarization and superimpose the extracted contour lines and the skin area to detect the shape of the hand.

When the store clerk holds the commodity A and a commodity code is read in the moving process, if the commodity A stays long in the reading window 103 or if the commodity A that frames out of the reading area of the reading window 103 enters the reading area again, the commodity code is read twice. In this case, the commodity A is not held in another way. Therefore, since a positional relation among the commodity A, the hand of the store clerk, and the barcode BC does not change, frame images captured when the commodity code is read twice are similar. Even if the commodity code read this time and the commodity code read most recently are the same, if the store clerk holds different commodities A and commodity codes are read in the moving process, since the positional relation among the commodity A, the hand of the store clerk, and the barcode BC changes, frame images related to the reading are not similar. Therefore, if the commodity code read this time and the commodity code read most recently are the same, the image comparing section 1613 compares images related to the reading of the commodity codes and detects whether the images are similar. This makes it possible to detect whether the commodity code is read twice.

The image comparing section 1613 may detect whether positional relations between the hand of the store clerk that grips the commodity A extracted from the contour lines obtained by binarizing the frame images and the barcode BC are similar. More specifically, the image comparing section 1613 detects a gripping position of the hand that grips the commodity A and a position where the barcode BC is affixed from the extracted contour lines and detects whether positional relations between the positions are similar in the frame images. The image comparing section 1613 may calculate the gripping position of the hand on the basis of, for example, the center of gravity of a coordinate of a fingertip obtained from the contour lines. In this case, it is possible to detect from a positional relation between the barcode BC affixed to the commodity A and the hand of the store clerk whether a commodity code is read twice.

The information output section 1614 outputs the commodity code read by the barcode reading section 1612 to the POS terminal 11 via the connection interface 175. Consequently, the POS terminal 11 can identify the commodity read by the commodity code reading apparatus 101 referring to the PLU file F1 on the basis of the output commodity code and register sales and the like of the commodity. If a result obtained by comparing the commodity code read this time and the commodity code read before this time and most recently in the image comparing section 1613 when the commodity codes are the same indicates that the images are similar, the information output section 1614 suppresses the output of the commodity code read this time. In other words, the information output section 1614 suppresses the output of the commodity code read twice to the POS terminal 11. Therefore, the POS terminal 11 can prevent, for example, registration of sales by the commodity code read twice in the commodity code reading apparatus 101.

The informing section 1615 informs the store clerk, through sound output by the sound output section 165, screen display on the display device 106 of the display and operation section 104, or the like, that the commodity code is read twice. Specifically, if a result obtained by comparing the commodity code read this time and the commodity code read before this time and most recently in the image comparing section 1613 when the commodity codes are the same indicates that the images are the same, the informing section 1615 informs, through warning sound or a warning screen different from that emitted or displayed when the commodity code is normally read, that the commodity code is read twice. Concerning the screen display on the display device 106, first, the informing section 1615 generates display data for performing display on the display device 106 and outputs the display data to the CPU 61 via the connection interface 175. Subsequently, the CPU 61 controls the display of the display device 106 on the basis of the display data from the informing section 1615. Consequently, for example, on the display device 106 of the display and operation section 104, display to the store clerk is performed. According to this information, the store clerk can recognize that the commodity code is read twice.

Figure 4:
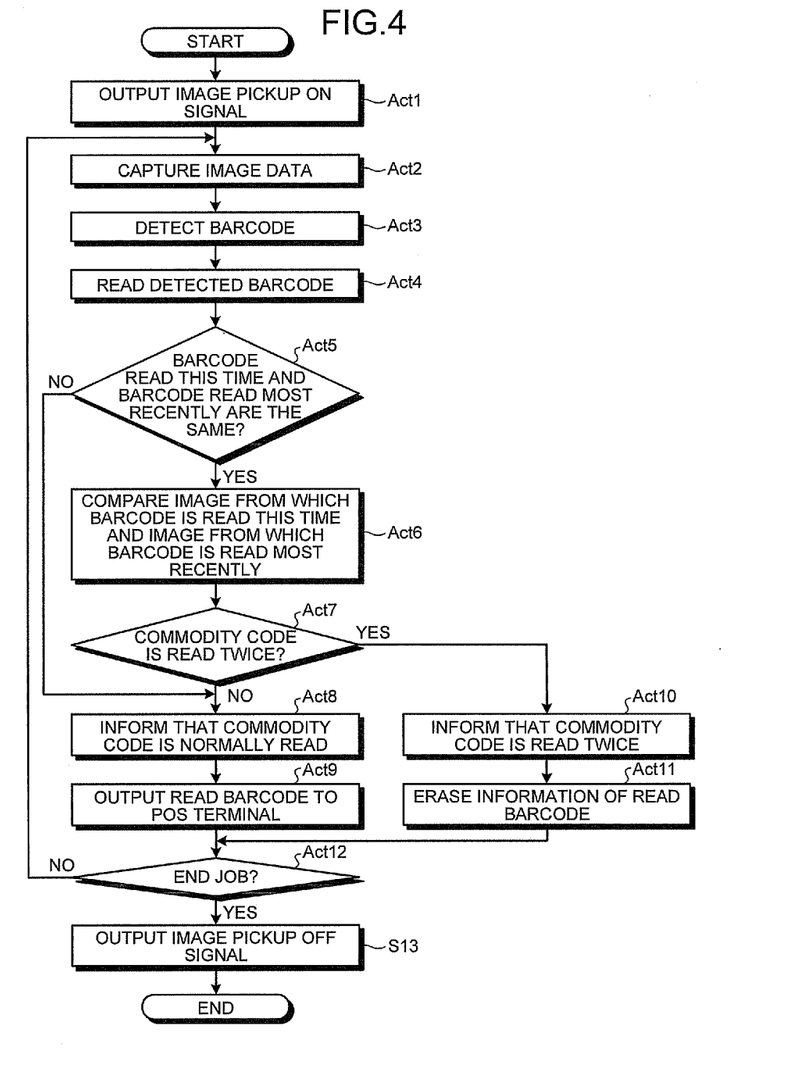
FIG. 4 is a flowchart for explaining an example of the operation of the commodity code reading apparatus.

The operation of the commodity code reading apparatus 101 is explained in detail. FIG. 4 is a flowchart for explaining an example of the operation of the commodity code reading apparatus 101.

As shown in FIG. 4, if processing is started according to, for example, the start of commodity registration by the POS terminal 11, the picked-up-image capturing section 1611 outputs an image pickup ON signal to the image pickup section 164 and starts image pickup by the image pickup section 164 (Act 1). Subsequently, the picked-up-image capturing section 1611 captures a frame image (a picked-up image) picked up by the image pickup section 164 and stored in the RAM 163 (Act 2).

The barcode reading section 1612 detects the barcode BC affixed to the commodity A included in the frame image captured by the picked-up-image capturing section 1611 (Act 3) and reads a commodity code corresponding to the barcode BC. The CPU 161 determines whether the commodity code read this time and a commodity code read before the reading of the commodity code and most recently are the same (Act 5).

If the commodity codes are not the same (No in Act 5), since it is unlikely that the commodity code is read twice, the CPU 161 advances the processing to Act 8. If the commodity codes are the same (Yes in Act 5), the image comparing section 1613 reads out, from the RAM 163, the frame image related to the barcode BC read this time and a frame image obtained by reading the barcode BC most recently and compares the frame images (Act 6). The CPU 161 determines, on the basis of a result of the comparison by the image comparing section 1613, whether the commodity code is read twice (Act 7).

Figure 5:
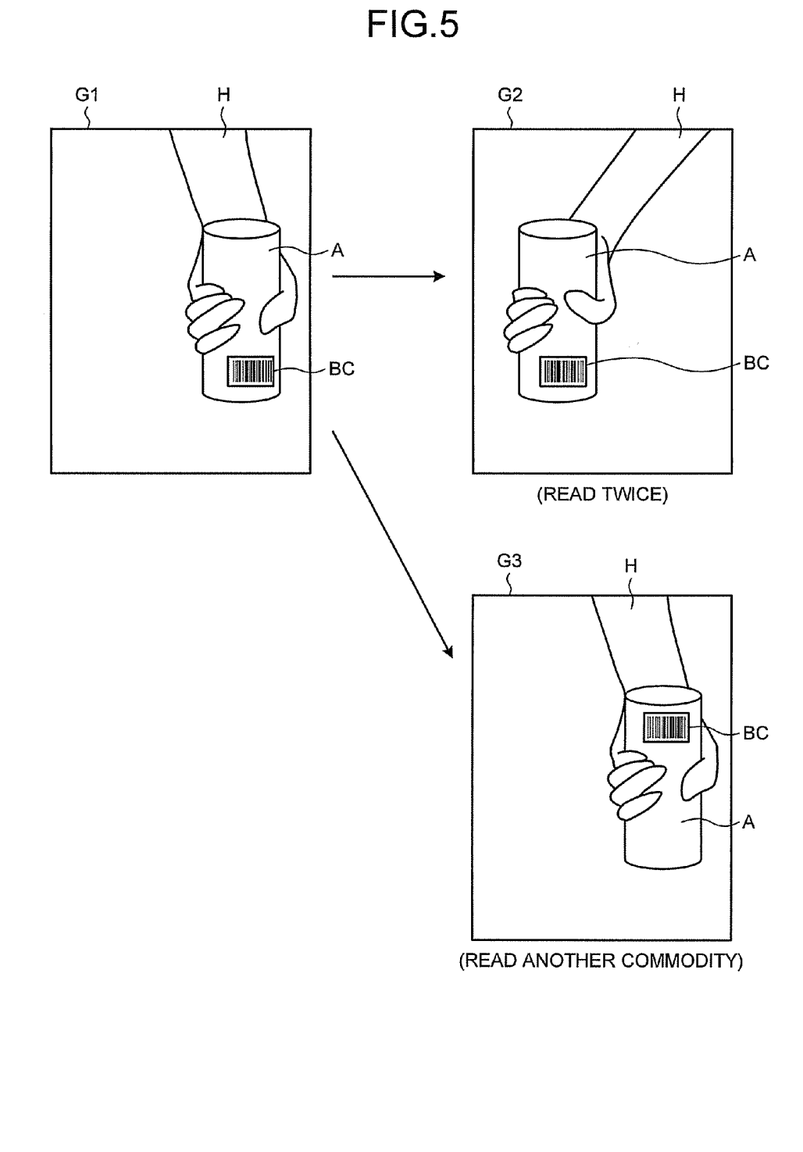
FIG. 5 is a conceptual diagram of an example of image comparison.

FIG. 5 is a conceptual diagram of an example of image comparison. In FIG. 5, the image G1 is a frame image obtained by reading the barcode BC most recently. Images G2 and G3 are respectively frame images related to the barcode BC read this time. If the image G1 and the image G2 are compared, since positional relations between the position of the barcode BC affixed to the commodity A and the gripping position of the hand H are similar to each other, the CPU 161 determines that the commodity A is not held in another way and the commodity code is read twice. If the image G1 and the image G3 are compared, since positional relations between the position of the barcode BC affixed to the commodity A and the gripping position of the hand H are not similar to each other and it is estimated that the commodity A is held in another way, the CPU 161 determines that the commodity code is not read twice but is normally read separately.

If the commodity code are not read twice (No in Act 7), the CPU 161 advances the processing to Act 8. If the commodity code is read twice (Yes in Act 7), the CPU 161 advances the processing to Act 10.

In Act 8, the informing section 1615 informs the store clerk, through sound output by the sound output section 165, screen display on the display device 106 of the display and operation section 104, or the like, that the commodity code is not read twice but is normally read. Subsequently, the information output section 1614 outputs the commodity code read by the barcode reading section 1612 to the POS terminal 11 via the connection interface 175 (Act 9) and advances the processing to Act 12.

In Act 10, the informing section 1615 informs the store clerk, through sound output by the sound output section 165, screen display on the display device 106 of the display and operation section 104, or the like, that the commodity code is read twice. Subsequently, the CPU 161 erases information of the barcode BC read by the barcode reading section 1612, i.e., the commodity code read by the barcode reading section 1612 and temporarily stored in the RAM 163 (Act 11) and advances the processing to Act 12. In this way, if the commodity code is read twice, the temporarily-stored commodity code is erased to prevent the commodity code read twice from being output to the POS terminal 11 by mistake.

In Act 12, the CPU 161 determines whether a job is ended according to, for example, notification of the end of commodity registration from the POS terminal 11. If the job is continued (No in Act 12), the CPU 161 returns the processing to Act 2 and continues the processing. If the job is ended (Yes in Act 12), the picked-up image capturing section 1611 outputs an image pickup OFF signal to the image pickup section 164 and ends the image pickup by the image pickup section 164 (Act 13). The CPU 161 ends the processing.

As explained above, the commodity code reading apparatus 101 captures an image picked up by the image pickup section 164 (Act 2), detects the barcode BC affixed to the commodity A included in the captured image (Act 3), and reads a commodity code corresponding to the barcode BC (Act 4). If the commodity code read this time and a commodity code read before this time and most recently are the same, the commodity code reading apparatus 101 compares frame images related to the reading of the commodity codes (Act 6). The commodity code reading apparatus 101 outputs the read commodity code. If the frame images are similar as a result of the comparison of the frame images, the commodity code reading apparatus 101 regards the commodity code read this time as the commodity code read twice (Yes in Act 7) and suppresses the output of the commodity code. Therefore, the commodity code reading apparatus 101 can prevent the commodity code from being read twice if the barcode BC stays long in the reading window 103 when the store clerk holds the commodity over the reading window 103 or if the commodity A that frames out of the reading area of the reading window 103 enters the reading area again. The commodity code reading apparatus 101 can more surely prevent the commodity code from being read twice.

The computer program executed in the commodity code reading apparatus 101 according to this embodiment is provided while being incorporated in a ROM or the like in advance. The computer program executed in the commodity code reading apparatus 101 according to this embodiment may be provided while being recorded in a computer-readable recording medium such as a CD-ROM (Compact Disc Read Only Memory), a flexible disk (FD), a CD-R (Compact Disc Recordable), or a DVD (Digital Versatile Disk) as a file of an installable format or an executable format.

The computer program executed in the commodity code reading apparatus 101 according to this embodiment may be provided while being stored on a computer connected to a network such as the Internet and downloaded through the network. The computer program executed in the commodity code reading apparatus 101 according to this embodiment may be provided or distributed through the network such as the Internet.

The computer program executed in the commodity code reading apparatus 101 according to this embodiment has a module configuration including the sections explained above (the picked-up-image capturing section 1611, the barcode reading section 1612, the image comparing section 1613, the information output section 1614, and the informing section 1615). As actual hardware, a CPU (a processor) reads out the computer program from the ROM and executes the computer program, whereby the sections are loaded onto a main storage and the picked-up-image capturing section 1611, the barcode reading section 1612, the image comparing section 1613, the information output section 1614, and the informing section 1615 are generated on the main storage.

Further effects and modifications can be easily derived by those skilled in the art. Therefore, a wider form of the present invention is not limited to the specific details and the representative embodiment represented and described above. Therefore, various changes are possible without departing from the spirit and the scope of the general concept of the invention defined by the appended claims and equivalents of the claims.

What is claimed is:

1. A code reading apparatus comprising:
   an image capturing section configured to capture an image picked up by an image pickup section;
   a code reading section configured to read code information corresponding to a code symbol included in the captured image;
   an image comparing section configured to compare, if the code information read this time and code information read before this time and most recently are the same, images related to the reading of the pieces of code information; and
   an output section configured to output the read code information and, if the images are similar as a result of the comparison of the images, regard the code information read this time as code information read twice and suppress output of the code information.

2. The apparatus according to claim 1, further comprising an informing section configured to inform, if the images are similar as a result of the comparison of the images, that the code information read this time is read twice.

3. The apparatus according to claim 1, further comprising a storing section configured to temporarily store the read code information before the output section outputs the code information, wherein
   the output section erases the commodity code read twice and temporarily stored in the storing section.

4. The apparatus according to claim 1, wherein the image capturing section captures an image of a code symbol, an image of a commodity to which the code symbol is affixed, and an image of a hand that grips the commodity.

5. The apparatus according to claim 4, wherein the image comparing section compares, in the comparison of the images, positional relations between the hand that grips the commodity and the code symbol included in the images and determines whether the positional relations are similar.

6. The apparatus according to claim 5, wherein the image comparing section extracts, in the comparison of the images, characteristic portions of the hand that grips the commodity and the code symbol according to contour lines obtained by binarizing the images and, if a number of matching points of the extracted characteristic portions is equal to or larger than a predetermined number, determines that the positional relations are similar.

7. The apparatus according to claim 5, wherein the positional relations are positional relations between a gripping position of the hand that grips the commodity and an affixing position of the code symbol.

8. A control method for a code reading apparatus comprising:
   capturing an image picked up by an image pickup section;
   reading code information corresponding to a code symbol included in the captured image;
   comparing, if code information read this time and code information read before this time and most recently are the same, images related to the reading of the pieces of code information; and
   outputting the read code information and, if the images are similar as a result of the comparison of the images, regarding the code information read this time as code information read twice and suppressing output of the code information.

9. The method according to claim 8, wherein the capturing an image includes capturing an image of a code symbol, an image of a commodity to which the code symbol is affixed, and an image of a hand that grips the commodity.

10. The method according to claim 9, wherein the comparing images includes comparing, in the comparison of the images, positional relations between the hand that grips the commodity and the code symbol included in the images and determining whether the positional relations are similar.

11. The method according to claim 9, wherein the comparing images includes extracting, in the comparison of the images, characteristic portions of the hand that grips the commodity and the code symbol according to contour lines obtained by binarizing the images and, if a number of matching points of the extracted characteristic portions is equal to or larger than a predetermined number, determining that the positional relations are similar.

12. The method according to claim 9, wherein the positional relations are positional relations between a gripping position of the hand that grips the commodity and an affixing position of the code symbol.

* * * * *